Aug. 23, 1927.

G. W. RYDNER 1,639,670

AIR VENT FOR TRANSMISSION UNITS

Filed Dec. 17, 1925

INVENTOR.

GUSTAF W. RYDNER

BY

ATTORNEY.

Patented Aug. 23, 1927.

1,639,670

UNITED STATES PATENT OFFICE.

GUSTAF W. RYDNER, OF ALPENA, MICHIGAN, ASSIGNOR TO HURON INDUSTRIES, INC., OF ALPENA, MICHIGAN, A CORPORATION OF MICHIGAN.

AIR VENT FOR TRANSMISSION UNITS.

Application filed December 17, 1925. Serial No. 75,929.

My invention relates to an air vent for transmission units. It has to do with the provision of a novel, efficacious and extremely simple device for controlling the lubricant within a transmission unit and preventing the lubricant from being forced out through the joints in the transmission housing.

Transmission units for various kinds of machinery and particularly transmission units comprising speed reducer used in heavy machinery require a large amount of oil for efficient operation. This oil heats up considerably due to the large amount of power transmitted by the transmission unit and friction resistance thereto, and heretofore in the art this heating up of the oil has tended to expand the air and force the oil out through the joints in the housing. It has been common in other arts, and particularly in connection with internal combustion engines to provide breathers or ventilators for controlling the flow of air to and from the crank case in response to movements of the engine pistons and for the general cooling of the cylinders, but so far as I am aware, no means has ever been provided for preventing the forcing out of oil through the joints of transmission units.

My invention contemplates the provision of a simple vent which may be inserted or connected to the housing of a transmission unit. By my device the expansion of the air caused by the heating up of the oil is compensated by the escape of the expanded air through the vent. This escape of the expanded air directly prevents the forcing out of the lubricant through the joints which are present in transmission housings. Furthermore, my invention is such that dust will be prevented from entering the housing, and the opening through the vent will tend to keep the lubricant cool and ventilated.

The preferred embodiment of my invention is shown in the accompanying drawing wherein similar characters of reference designate corresponding parts, and wherein Fig. 1 is an end elevation of a typical transmission unit housing and showing my air vent inserted in the top thereof.

Figure 1:
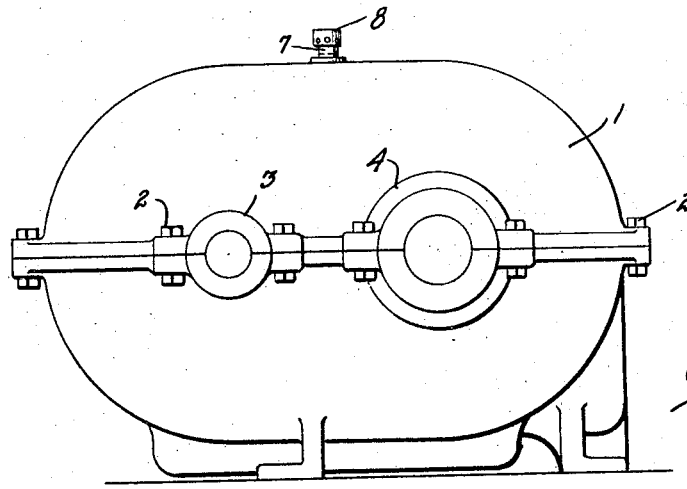

In the drawings, the transmission unit housing may be designated 1. It will be understood that this housing may be of any general type, according to the type of machinery with which it is to be used. However, for the purpose of illustration, this housing 1 is shown as being formed in two parts, an upper and lower half, the two halves being bolted together by suitable bolts 2.

Figure 2:
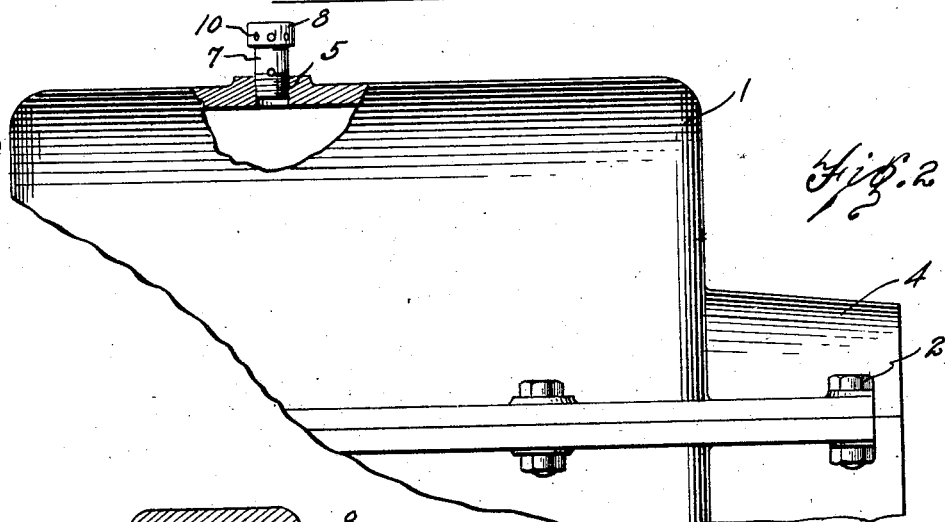
Fig. 2 is a fragmentary side elevation of the structure illustrated in Fig. 1 and showing the manner of inserting the air vent in the transmission housing.

The housing 1 is also for purposes of illustration, shown as being provided with hubs 3 and 4 for receiving the bearings and shafts carrying the ordinary speed reducing pinions and gears. Due to the general construction of this type of transmission unit, the housing 1 is divided along a line coinciding with the axes of the gear shafts, as best shown in Figs. 1 and 2.

Figure 3:
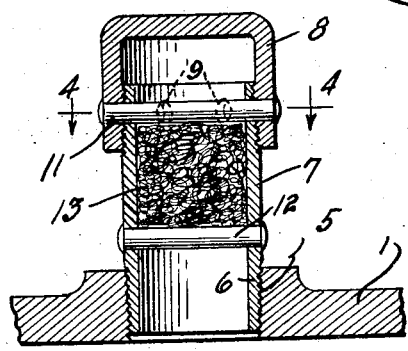
Fig. 3 is a fragmentary vertical section of my novel air vent applied to a transmission housing and showing the simple construction of the air vent and manner of assembling the same.
Figure 4:
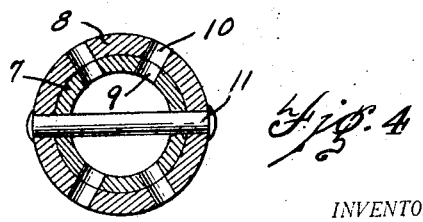
Fig. 4 is a detail sectional view taken on the line 4—4 of Fig. 3.

In order to receive my novel air vent, the housing 1 is shown in Fig. 3 as being provided with a threaded aperture 5. This threaded aperture 5 is designed to receive the threaded base 6 of my air vent. This air vent in its preferred construction comprises a standard nipple 7 threaded at the base as above indicated and also threaded at its upper end to receive the internally threaded pipe cap 8. The upper end of the nipple 7 and the pipe cap 8 are provided with a series of registering apertures 9 and 10 respectively. Through one set of diametrically opposite apertures a dowel pin 11 is designed to be inserted. This dowel pin 11 serves to lock the pipe cap 8 to the nipple and also to hold the apertures 9 and 10 in registering relation.

At a point spaced below the dowel pin 11 the nipple 7 is also provided with a set of diametrically positioned apertures for receiving a second dowel pin 12. An air strainer 13 of felt or other similar material is designed to be inserted between and held in place by such dowel pins 11 and 12.

In operation, regardless of the speed or length of operation of the gearing within the transmission unit or the degree to which the lubricant therein is heated, the expanded air will be allowed to escape through the apertures in the air vent and the lubricant will thus be prevented from being forced through the joints in the transmission housing. Furthermore, the air entering the transmission housing due to the contraction of the air within or circulation, will be prevented from carrying any dust into the housing by the air strainer positioned within the air vent.

It will thus be seen that I have provided an extremely simple and compact, but inexpensive device adapted to be easily and quickly inserted in the housing of any transmission unit and which when inserted, will positively prevent the lubricant in the transmission housing from being forced out through the usual joints forming a part of the housing.

What I claim is:

1. An air vent for use with transmission units or the like comprising a conduit, a cap enclosing one end of said conduit, a dowel pin passing through said cap at one end of said conduits, another dowel pin located in said conduit, and air filtering means positioned in said conduit between said dowel pins.

2. An air vent for transmission units or the like comprising a conduit, apertures at one end thereof, a cap for said conduit provided with apertures, means insertable through apertures in said pipe and cap for maintaining other apertures in said pipe and cap in registering relation.

3. An air vent for transmission units, or the like, comprising a single piece conduit, a cap enclosing one end of said conduit, the other end of said conduit being inserted in the transmission housing, and air filtering means positioned in said conduit between the ends thereof, said cap and conduit having aligned vent openings in their side walls which are positioned above the filtering means.

In testimony whereof I have affixed my signature.

GUSTAF W. RYDNER.